United States Patent
Honigsbaum

[15] 3,638,054
[45] Jan. 25, 1972

[54] ALTERNATING CURRENT ELECTROFLUID DYNAMIC ENERGY CONVERSION DEVICE

[72] Inventor: Richard F. Honigsbaum, 21 A Barry Gardens, Passaic, N.J. 07055
[22] Filed: Apr. 4, 1969
[21] Appl. No.: 813,517

[52] U.S. Cl. ................................................310/10, 73/194
[51] Int. Cl. .........................................H02n 3/00, G01f 1/00
[58] Field of Search ..................310/10, 11; 322/2.1; 60/202; 103/1 E; 73/194 E, 194 F

[56] References Cited

UNITED STATES PATENTS

| | | | |
|---|---|---|---|
| 3,417,267 | 12/1968 | Marks | 310/6 |
| 3,440,458 | 4/1969 | Knight | 310/11 |
| 3,465,180 | 9/1969 | Von Ohain et al. | 310/11 |

Primary Examiner—D. X. Sliney
Attorney—Hubbell, Cohen & Stiefel

[57] ABSTRACT

An energy conversion device of the alternating current electrofluid dynamic type uses the electric field coupling between a spatio-temporally periodic charge distribution in a fluid stream and a plurality of electrodes at different points along the stream to interchange alternating current electrical energy at the electrodes with the flow energy of the stream. Energy can flow in either direction. If the device is used to supply an electrical load connected to the electrodes it is an alternating current electrofluid dynamic generator and can also be used as an amplifier, oscillator, flow meter, and the like. If the device is supplied alternating current electrical energy in order to accelerate the fluid it is an alternating current electrofluid dynamic pump and can also be used as a compressor, thrust engine, and the like. A nozzle and charging electrode arrangement is used to produce the spatio-temporally periodic charge distribution.

30 Claims, 17 Drawing Figures

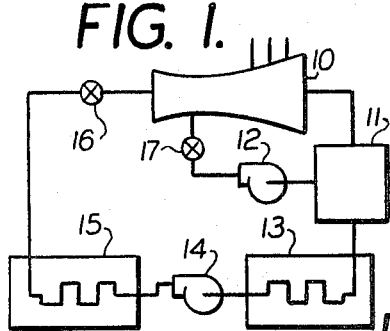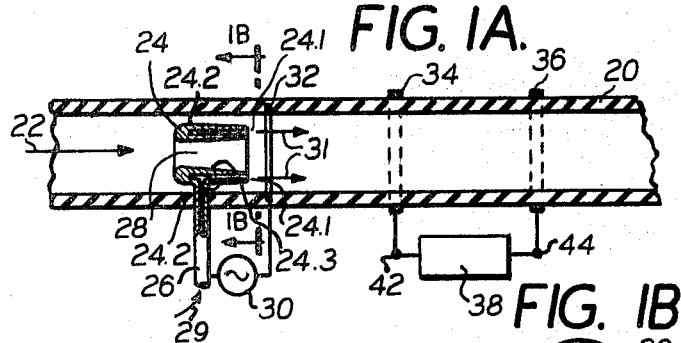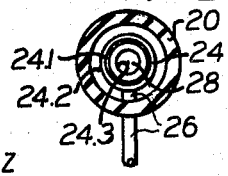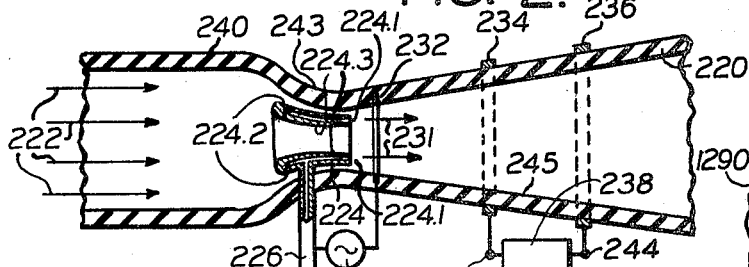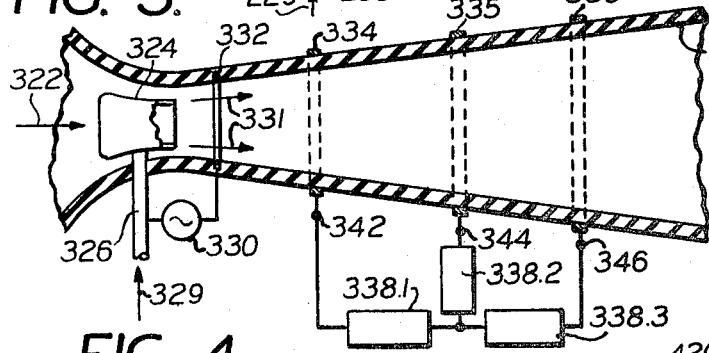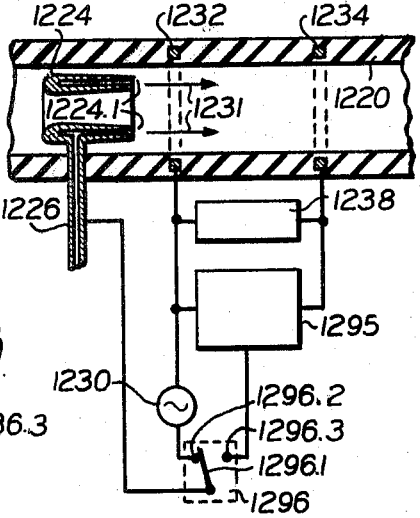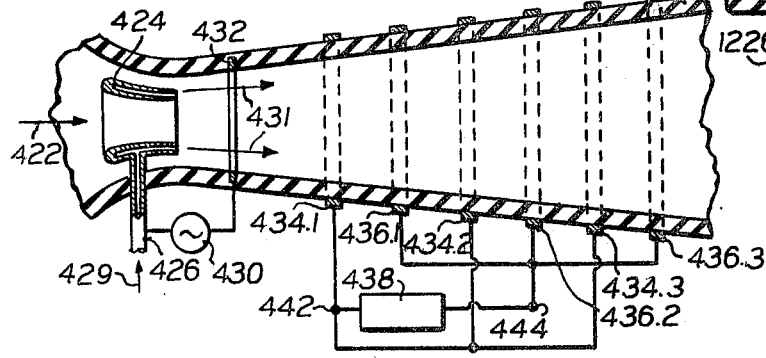

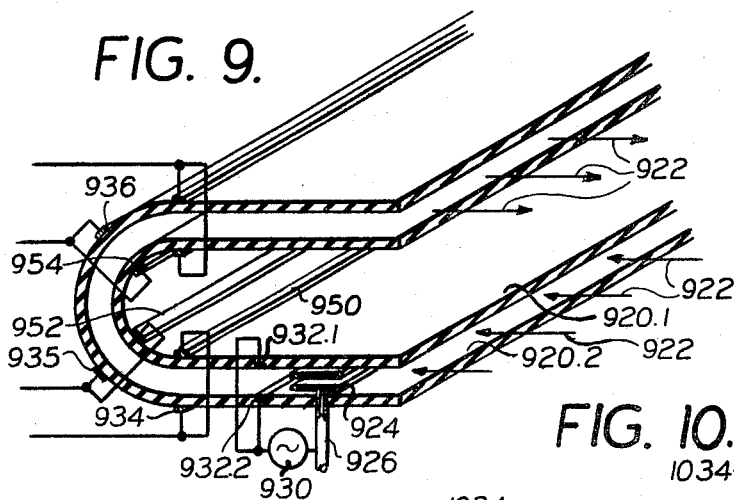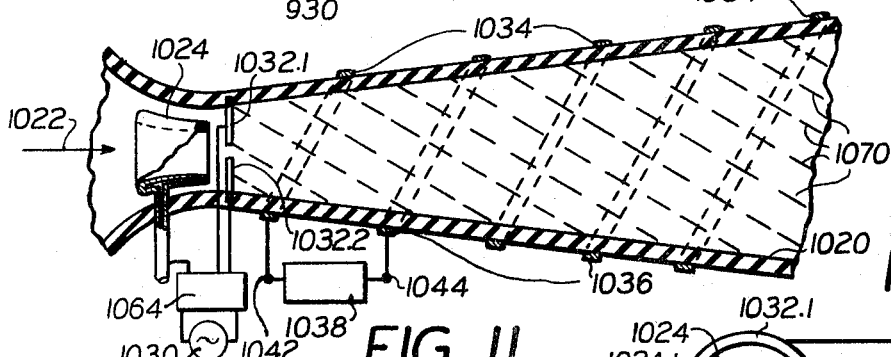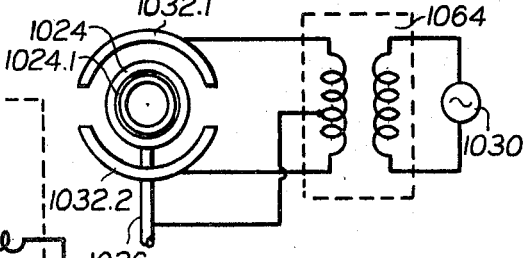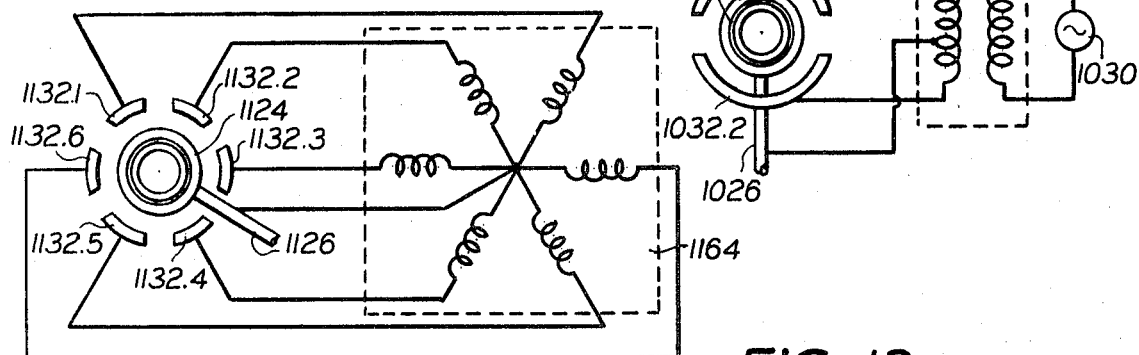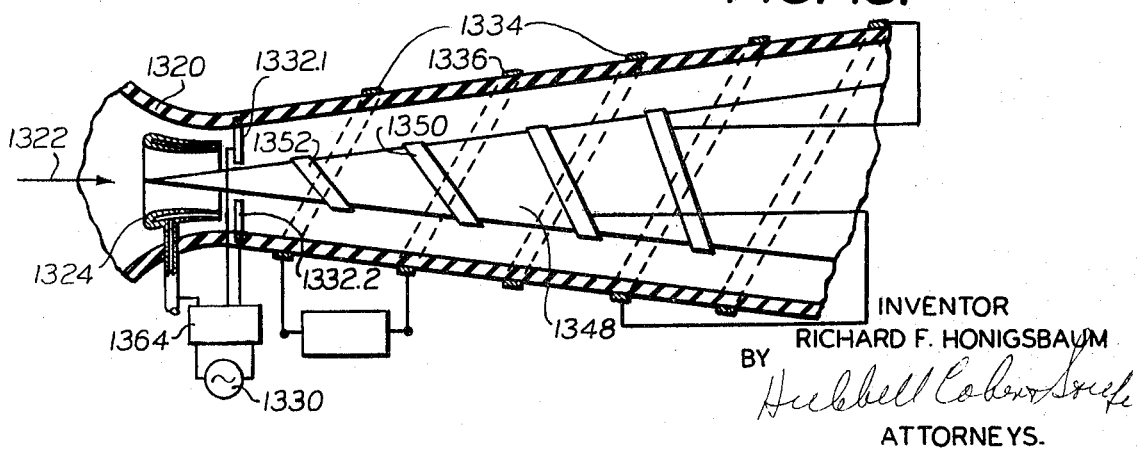

3,638,054

ALTERNATING CURRENT ELECTROFLUID DYNAMIC ENERGY CONVERSION DEVICE

FIELD OF THE INVENTION

This invention is an alternating current electrofluid dynamic device having utility in a wide range of applications including AC power generation, amplification, flow instrumentation, fluid pumping, fluid compression, and propulsion.

THE PRIOR ART

In the field of electrical power generation it has long been recognized that the conventional arrangement of a thermal prime mover driving rotating electrical machinery leaves much to be desired and efforts have been directed toward a more direct method of energy conversion, particularly one which eliminates the need for moving parts. Magnetofluid dynamic and electrofluid dynamic approaches are currently under investigation, but these have yet to produce entirely satisfactory results. Magnetofluid dynamic devices are burdened with high energy magnetic field requirements and electrofluid dynamic devices are burdened with elaborate field grading devices, particularly in the larger sizes. Since these devices are inherently DC there is the problem of circulating currents in the magnetofluid dynamic devices and of space charge accumulation in the electrofluid dynamic devices, and these problems increase with size. Extremely high terminal voltage leads to additional problems of leakage current and internal breakdown in the electrofluid dynamic devices.

In an entirely different area of the art, electrofluid dynamic techniques have been applied experimentally to propulsion devices, particularly for use as thrust engines in aerospace applications. Here too the problem of space charge accumulation has been among the factors which have prevented this approach from being entirely satisfactory.

SUMMARY AND OBJECTS OF THE INVENTION

One object of this invention is to provide an electrofluid dynamic device which is superior to those known to the prior art. In more specific terms, a spatio-temporally periodic charge distribution is introduced as part of the means to effect electrofluid dynamic energy transfer. This charge distribution changes sign periodically in time at a given point permitting capacitive rather than conductive coupling between the charge distribution and the external circuitry and limiting local accumulation of charge of a given sign to half a period. This charge distribution also changes sign periodically in space permitting reduction in terminal voltage by common connection of electrodes at corresponding phase points. Accordingly, it is an object of the invention to provide an electrofluid dynamic device in which the charge distribution is a periodic function of both space and time. An object of the invention which can be achieved by the periodic charge distribution is alternating current electrofluid dynamic energy conversion. A very important object of the invention is the generation of AC electricity. A related object is to provide an alternating current electrofluid dynamic device for use as an amplifier, oscillator, flowmeter, and the like. An additional object is to provide an alternating current electrofluid dynamic device for use as a pump, compressor, thrust engine, and the like.

In carrying out these objectives a spatio-temporally periodic charge distribution in a dielectric fluid is transported along a flow path where the charge distribution is electrically coupled with a plurality of electrodes along the flow path in order to interchange alternating current electrical energy at the electrodes with fluid energy in the stream. Electrodes are arranged to suit requirements for single phase or polyphase, and are paralleled where lower terminal voltage is desired. Flow paths are contoured to suit the working fluid, and a nozzle and charging electrode arrangement is used to provide the charge distribution.

BRIEF DESCRIPTION OF THE DRAWINGS

FIG. 1 is a schematic representation of a power generating system embodying the present invention;

FIG. 1A is a longitudinal sectional view of the main part of one embodiment of an electrofluid dynamic device in accordance with this invention;

FIG. 1B is a transverse sectional view of the same device taken along the lines 1B—1B of FIG. 1A looking in the direction of the arrows;

FIG. 2 is a longitudinal sectional view of an alternative embodiment of the device of this invention specifically adapted for use with a gas stream;

FIG. 3 is a longitudinal sectional view of another embodiment of this device adapted for three phase operation;

FIG. 4 is a longitudinal sectional view of another embodiment of this device having multiple electrodes connected for single-phase operation;

FIG. 9 is a view partly in transverse section and partly in perspective of another embodiment of this device in which the fluid conduit is a double cylinder;

FIG. 10 is a longitudinal sectional view of another embodiment of this device in which the particle path and the electrode configuration are helical;

FIG. 10A is a transverse sectional view showing one possible charging electrode configuration for use with the embodiment of FIG. 10;

FIG. 11 is a transverse sectional view illustrating an alternative charging electrode configuration for use with the embodiment of FIG. 10;

FIG. 12A is a longitudinal sectional view of the upstream portion of a typical embodiment of the device illustrating the use of a guard electrode;

FIG. 12B is a longitudinal sectional view of another embodiment of this device adapted for self-excitation; and FIG. 13 is a view similar to FIG. 10 showing still a further modification.

The same reference characters refer to the same elements throughout the several views of the drawing, and reference characters with the same two terminal digits refer to corresponding elements.

DETAILED DESCRIPTION OF THE PREFERRED EMBODIMENTS

Figure 5:
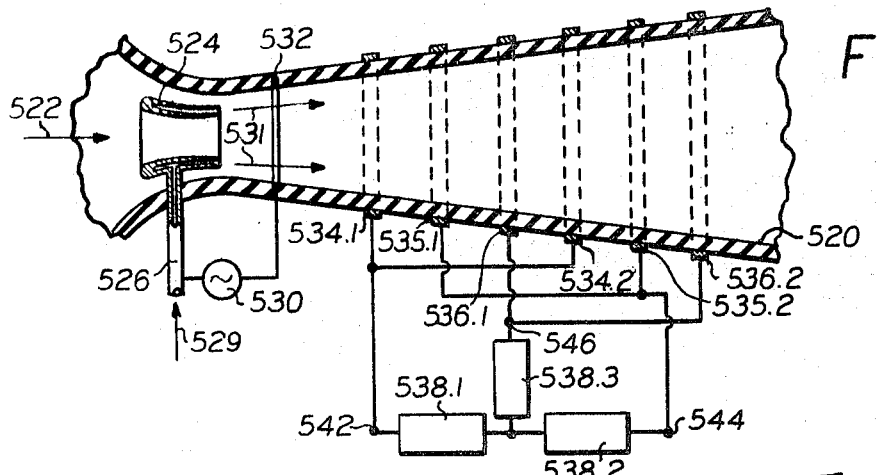
FIG. 5 is a longitudinal sectional view of another embodiment of this device having multiple electrodes connected in three-phase relationship.

In the embodiments of FIGS. 1A and 1B the electrofluid dynamic device of this invention includes a tubular electrically insulating conduit 20 made of a dielectric material. The interior of the conduit 20 provides a path through which a fluid flows as indicated by arrow 22. The fluid is preferably a dielectric liquid or gas. Near the upstream end of the conduit 20 is an annular nozzle 24 connected to a leader 26 for injecting particulate matter into the fluid stream (arrows 29 and 31). The nozzle is formed with an axially oriented central opening 28 through which the central portion of the fluid stream flows. The exit opening 24.1 of nozzle 24 is located at the trailing edge of the nozzle so that the particles will extend beyond the nozzle from the instant they begin to emerge. Nozzle outer surface 24.2 and inner surface 24.3 and central opening 28 are preferably shaped and proportioned so that fluid velocity on either side of the trailing edge is substantially the same. While the continuous nozzle exit opening 24.1 is preferred, the exit opening may alternately be a finite collection of conveniently shaped holes.

The fluid is made to flow past the nozzle by some convenient means such as the pressurizing of the flow region upstream of the nozzle. The particulate matter, a liquid or a finely divided solid dispersed in a liquid or gas, is injected into the fluid stream at nozzle opening 24.1 because of the difference in pressure between the particulate matter in the nozzle and the stream at the nozzle opening. The particles formed from the particulate matter should be large when compared with the molecular size of the fluid. If the particulate matter is a liquid it is also atomized as it exits from the nozzle. The size of the atomized particles may be controlled by controlling the relative fluid to particulate matter flow rates and velocity. The energy for atomization and injection is drawn from the flow energy of the fluid unless the particulate matter is suitably pressurized.

A source 30 capable of generating a temporally periodic potential is provided. Source 30 is shown symbolically as an AC generator. This supply is adjustable with respect to phase angle, waveform, and voltage level by means well known to persons skilled in the art. Thus, adjustment of input phase angle can be used to adjust output phase angle, whereby to permit paralleling of generators, as will be obvious to the skilled art worker.

The leader 26 and nozzle 24 are preferably made of conductive material such as metal and are connected to one terminal of source 30. The other terminal of source 30 is connected to a conductive charging ring 32 which is shown embedded in the wall of conduit 20. The ring, preferably of metal, may alternatively be placed on the outside of the conduit 20 or in a recess in the inner wall of the conduit 20 so arranged as to avoid local turbulence in the fluid stream, or it may be partially embedded in the wall of the conduit, but the preferred arrangement is the one in which the ring is buried within the material of the conduit and separated from the fluid stream by a thin section of the conduit material. Connection to the buried ring is preferably made by a well insulated lead the details of which have been omitted for clarity because such details are well known to persons skilled in the art.

As the particulate matter emerges from the nozzle 24, the charging ring 32, nozzle 24, and source 30 act to charge the particles with a charge whose sign matches the polarity of nozzle 24 with respect to ring 32. During the half cycle for which the nozzle is positive with respect to the ring the charged particles which emerge from the nozzle will have positive charge; during the half cycle for which the nozzle is negative with respect to the ring the charged particles which emerge from the nozzle will have negative charge. Since the charged particles are carried downstream from the nozzle by the fluid stream, the temporally periodic variation of charge imparted to successive particles is converted into a spatio-temporally periodic distribution of charge extending downstream from the nozzle 24. The axial distance between nozzle 24 and charging ring 32 is chosen to provide effective particle charging.

It is necessary that no substantial amount of conductive material electrically connected to the nozzle be interposed between the charging ring 32 and the exit opening 24.1 for the particulate material 31 (excepting, of course, the particulate material itself) as such conductive material would adversely affect the charging of the particulate material.

In this downstream region is a pair of electrode rings 34 and 36 which are coupled to the spatio-temporally periodically distributed charge so that the electrodes can, for example, derive a useful electrical output therefrom. These rings 34 and 36 are shown mounted on the outer surface of the wall of conduit 20 so that they are separated from the charged particles by the dielectric material of the conduit. Accordingly, the rings 34 and 36 are capacitively rather than conductively coupled to the charge distribution thus minimizing the risk of ring potential discharge in the stream. The output rings 34 and 36 may alternatively be partially embedded in the wall of the conduit 20 or placed in a recess in the inner wall so as to minimize local turbulence, but the preferred arrangement is one in which these electrodes are buried in the material of the conduit and separated from the fluid stream by a thin section of the conduit material. Connections to the buried rings are preferably made by well insulated leads, the details of which have been omitted for clarity because such details are well known to persons skilled in the art.

It is to be noted from the above that the preferred disposition of the output rings 34 and 36 in conduit 20 is the same as that for the charging ring 32 and that neither is exactly represented in any of the drawings. The particular arrangements shown in the figures were selected for clarity of illustration.

Defining "local wavelength" as the minimum distance between corresponding phase points of the charge distribution at a particular section along conduit 20, the distance between adjacent electrodes can be measured in "local wavelengths." As long as the spacing between output electrodes 34 and 36 differs from an integral number of local wavelengths these electrodes will be elevated to different potentials by the charge distribution and there will be a potential difference between them. To put it another way, as long as the spacing between output rings 34 and 36 is not an integral multiple of 360 electrical degrees, taking 360 electrical degrees as the distance between corresponding phase points along the charge distribution, a voltage will be present between the rings. This voltage can be used to drive a current through a load 38 which is connected across the electrodes 34 and 36 by means of output terminals 42 and 44. Electrodes 34 and 36 are at maximum potential difference when their spacing is an odd integral number of half local wavelengths (i.e., 180 electrical degrees). As used hereinafter, the word "wavelength" is synonymous with the expression "local wavelength."

If electrode 34 is under the local influence of a negatively charged portion of the charge distribution while electrode 36 is under the local influence of a positively charged portion of the charge distribution then half a period later the signs of the respectively charged portions of the distribution influencing the electrodes will reverse, reversing the potentials of the electrodes, and load 38 is connected to an alternating potential. Accordingly, this invention obtains an AC rather than a DC output from a fluid-dynamic generator.

In addition, the alternating characteristics of this device provide a solution to the problem of space charge accumulation which has plagued prior art electrofluid dynamic devices. In the course of operation such devices have a tendency to collect high charge densities in static pockets, and these accumulations produce local fields which impede continued operation of the device. In the present invention, however, the conduit 20 downstream of the nozzle 24 is continuously swept by a stream containing a periodic charge distribution so that any tendency to collect charge of a given sign is corrected and reversed every half period. Accordingly, no local charge accumulations are allowed to develop for a time longer than half a period.

The nozzle 24-source 30-charging ring 32 charging arrangement in this invention eliminates the hazards of breakdown and deterioration due to the deleterious effects of corona discharge, ion-electron beams, radioactive materials, X-rays and the like associated with other charging schemes. Particles are charged upon emergence from the nozzle because free charges with sign opposite to the polarity of the charging ring with respect to the nozzle are attracted to the emerging particulate matter by the charging ring while those with the same sign are driven away. If electrons are the only free particles available a ring at positive polarity with respect to the nozzle will attract electrons to the emerging particulate matter resulting in particles carrying an excess complement of electrons (i.e., negative particles) while a ring at negative polarity with respect to the nozzle will drive electrons from the emerging particulate matter resulting in particles with a less than normal complement of electrons (i.e., positive particles). The charging potential must be great enough to effect the required charge redistribution in the time during which the emerging particle is attached to the nozzle. Since this time is shorter for smaller particles, higher potentials must be used. While almost any convenient substance may be used as the particulate matter if sufficient charging potential is available, higher conductivity particulate matter offers an advantage in permitting lower charging potential.

For example, in a laboratory device somewhat like FIG. 2 wherein the throat of the conduit 220 is about a quarter of an inch in diameter and the divergent portion of the conduit 220 is approximately 3½ inches long and diverges to a diameter of approximately ⅜ inch, and wherein the particulate matter is tap water and the charging ring 232 is about 1/10 inch downstream from the confronting end of the nozzle 224 the output voltage of the source 230 is about 1,000 volts at about 2,000 Hertz.

FIG. 1 shows a closed cycle thermal generating system using a vapor as the working fluid and in which the conventional turbine generator and associated auxiliaries are replaced by an alternating current electrofluid dynamic generator 10, particle recovery device 11, particle control valve 17, and particle recirculation device 12. Particle recovery may alternately take place in condenser 13 if the particulate matter is immiscible with the working fluid in its liquid state. Particle recovery is unnecessary if the particles are a liquid phase of the working fluid but this advantage is offset by the special precautions which must be taken to avoid excessive vaporization or condensation of such particulate matter. The working fluid is pumped in its liquid state by condensate pump 14 from condenser 13 to boiler 15 where it is converted to a vapor by the addition of heat. The vapor passes from boiler 15 through flow control valve 16 into the electrofluid dynamic generator 10 where some of the flow energy is converted into alternating current electrical energy and then to condenser 13 where the vapor is returned to its liquid state. Particle recovery is effected between generator 10 and condenser 13, or as described above. Particles are recirculated by particle recirculation device 12 through particle control valve 17 to generator 10. Since the rotating turbine and generator have been replaced by a device in which there are no moving mechanical parts the working fluid can be sealed within the system by the simple expedient of using hermetically sealed pumps and valves. Since such sealing minimizes the risks of leakage and contamination a greater degree of freedom exists with respect to the choice of working fluid and heating source. The integrity of the sealed system may be great enough to permit heating directly from radioactive thermal sources. The generator may also be used in an open cycle system with or without particle recovery. It may be powered by the release of a gas stored in a pressure vessel, or by the output of a combustion chamber. The above is not intended to exhaust the list of possible applications but rather to list some of the areas where this device may be preferred to conventional equipment.

Because the alternating current electrofluid dynamic generator is an electric field device its upper temperature limit is that at which gaseous working fluids suffer appreciable thermal ionization and can no longer sustain the required electric fields. This thermal ionization temperature is well above that tolerated by conventional prime movers so that higher thermal efficiencies can be expected. Wall temperature can be kept within acceptable limits by cooling.

The embodiment of FIG. 2 is similar to that of FIGS. 1A and 1B in that it includes a conduit 220, a nozzle 224 for injecting particles 229, 231 fed by a leader 226, a charging source 230 connected between the leader 226 and a charging ring 232, and a pair of output electrodes 234 and 236 connected to a load 238 via terminals 242 and 244. This embodiment however is designed specifically for use with a fluid stream 222 of gaseous material. Accordingly, the conduit 220 has an enlarged diameter at its entrance end 240, then narrows to form a venturi 243 in the neighborhood of nozzle 224, so that the gas velocity is thereby increased, and finally widens out downstream to form a divergent section 245. In addition the nozzle inner surface 224.3 and outer surface 224.2 along which the gaseous fluid flows are aerodynamically shaped to minimize obstruction to fluid flow and to provide substantially the same velocity of gaseous fluid flow past either side of the downstream opening 224.1. The nozzle 224 is axially positioned so that the downstream opening 224.1 is in the region of highest velocity of gaseous flow in the venturi section 243. The pressure drop which results in the venturi section 243 assists in drawing the particulate matter out of nozzle 224 and may make it unnecessary to deliver particles 229 under pressure to the leader 226. The divergent conduit section 245 converts some of the internal energy of the gaseous fluid into kinetic energy of translation. This contributes to the electrical power extracted by the output electrodes 234 and 236, since in an electrofluid dynamic generator of this kind it is the motion of the charged particles entrained in the fluid stream which provides the energy for electrical power generation.

The embodiment of FIG. 3 is also similar, comprising a conduit 320 receiving a fluid stream 322, a nozzle 324 fed by a leader 326 for injecting particles 329, 331 and a source 330 connected between the leader 326 and the charging ring 332. While the conduit 320 is shown to have a divergent section for use with a gaseous fluid, a conduit with uniform section such as conduit 20 of FIG. 1A may also be used. In this embodiment, however, there are three output electrodes 334, 335, and 336, each coupled to a different phase of the charge distribution. The preferred spacing between electrodes 334 and 335, and 335 and 336 is that for which both distances are either one-third or two-thirds of an integral number of local wavelengths excluding the integral numbers of wavelengths divisible by three. With either of these arrangements the voltages at the electrodes are 120 electrical degrees apart, i.e., a balanced three-phase relationship. Accordingly, a three-phase load 338.1, 338.2, and 338.3 may be connected to the electrodes by means of output terminals 342, 344, and 346. A star (wye) type connection is shown in FIG. 3 although it is apparent that the delta-type connection can also be employed if desired.

The electrical configuration represented by FIG. 3 can be generalized to $m$ phases by providing $m$ electrodes spaced apart an integral number ($Z$) of local wavelengths ($\lambda$) divided by $m$ providing this division results in a fraction of a wavelength whose denominator is the number of phases, plus $n$ wavelengths, where $n$ is an integer including zero. Any of these polyphase arrangements can obviously be loaded single phase. Thus Preferred Electrode Spacing = $Z\lambda/m + n\lambda$ FIG. 4 illustrates the use of a multiple output electrode configuration to produce a single-phase output. This embodiment introduces a fluid stream 422 into a conduit 420 in which is situated a nozzle 424 fed by a leader 426 for the purpose of injecting particles 429, 431. While the conduit 420 is shown to have a divergent section for use with a gaseous fluid, a conduit with uniform section such as conduit 20 of FIG. 1A may also be used. The charging source 430 is connected between the leader 426 and the charging ring 432. One side of a load 438 is connected to a group of alternate electrodes 434.1, 434.2, and 434.3 by means of an output terminal 442. The electrodes 434.1, 434.2, and 434.3 are spaced substantially an integral number of local wavelengths apart. Common connection is possible because each of the electrodes 434.1, 434.2, and 434.3 is at substantially the same phase point with respect to the charge distribution. The other side of the load 438 is connected by means of output terminal 444 to another group of output electrodes 436.1, 436.2, and 436.3 which are alternately interleaved with the first group. The electrodes 436.1, 436.2, and 436.3 are also spaced substantially an integral number of local wavelengths apart and can be connected together for the reason advanced above. The spacing between any electrodes of the group 434.1, 434.2, and 434.3 and any electrodes of the group 436.1, 436.2, and 436.3 is preferably an odd integral multiple of half a local wavelength so that the electrodes of the first group and associated output terminal 442 are displaced by 180 electrical degrees from the electrodes of the second group and associated output terminal 444.

The advantage of this embodiment is that it enables the frequency of the source 430 to be increased, which will result in a decrease in the potential difference between electrode pairs whereby to enable the device to operate at manageable voltage levels. In this connection it is desirable that the electrodes 434 and 436 be spaced apart a half wavelength and that the maximum charge available be utilized to effect the energy conversion. Thus for a given conduit length in which energy conversion takes place, if there by only a single pair of electrodes, they are preferably spaced apart by that conduit length, and the frequency of the alternating current source is adjusted to render that distance one-half wavelength. Thus, for example, if the conduit length in which energy conversion takes place is 100 centimeters and the frequency of the charging source is adjusted to render that one-half wavelength, and assuming that a workable maximum voltage gradient is 10 kilovolts per centimeter, then the voltage between the pair of electrodes could be a million volts, a difficult value to work with.

However, if 10 pairs of electrodes are arranged as in FIG. 4 to occupy the same 100 centimeters, then, in order to obtain the half wavelength spacing, the frequency of the source 430 will be increased by a factor of 10. This will result in the potential difference between any given pair of electrodes to not exceed 100,000 volts, a much more acceptable voltage level.

As the number of wavelengths for a given conduit length in which energy conversion is to take place in increased, two limiting factors in addition to obvious constructional problems must be considered. The first, a decrease in the coupling between output electrodes and charged particles near the axis of conduit 420, is the subject of refinements shown in other figures herein. The second is nonuniform gradient because of the difference in local wavelength. The electrodes spaced further apart because of increased local wavelength operate at reduced gradient. Flow path contouring to preserve wavelength spacing is one way to restore uniform gradient, and subgrouping of electrodes into subgroups of substantially the same spacing is another. Each of the subgroups is connected to a different transformer tap or winding if a two terminal single phase output is required.

Figure 6:
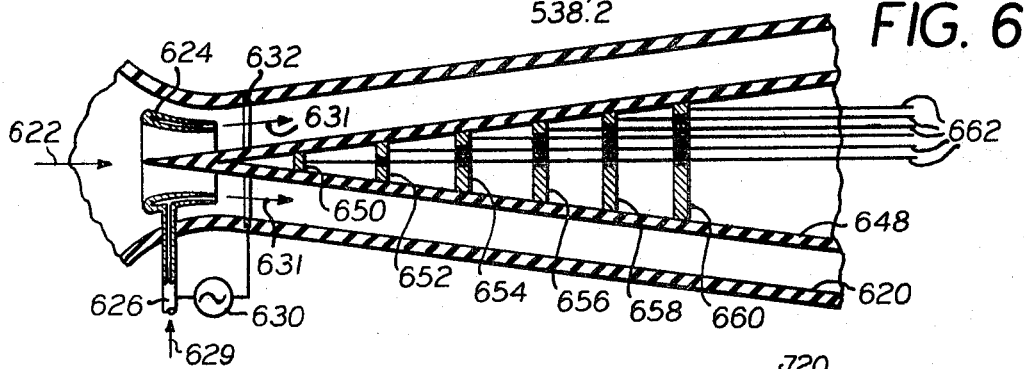
FIG. 6 is a longitudinal sectional view of another embodiment of this device in which the electrodes are axially situated.

In FIG. 5 the fluid stream 522 again enters a conduit 520, particles 529, 531 are injected through a leader 526 and a nozzle 524, and a charging source 530 is connected between the leader 526 and a charging ring 532. Again conduit 520 is shown with a divergent section for use with a gaseous fluid, but a conduit of substantially uniform section may also be used. In this embodiment the output electrode configuration combines features of the FIG. 3 and FIG. 4 embodiments. Specifically, a first group of output rings 534.1 and 534.2, a second group of output rings 535.1 and 535.2, and a third group of output rings 536.1 and 536.2 are connected to respective output terminals 542, 544, and 546, and a three-phase load 538.1, 538.2, and 538.3 is connected in a star (wye) configuration to the output terminals. A delta connection may alternately be used. The electrodes in any one group are spaced substantially an integral number of wavelengths apart so that a plurality of electrodes at substantially the same phase point with respect to the charge distribution are connected together as in the embodiment of FIG. 4, while the spacing between adjacent electrodes and number of phases and terminals is that of the three-phase embodiment of FIG. 3. Subgrouping and other refinements discussed in the embodiment of FIG. 4 can also be used. The extension of the embodiment of FIG. 5 to any desired number of phases will be apparent to the skilled art worker, especially in light of the description of FIG. 3. In the embodiment of FIG. 6 a fluid stream 622 is introduced into conduit 620, and particles 629, 631 are injected through a leader 626 and nozzle 624. The particles are charged by a source 630 connected between the leader 626 and a charging ring 632. In this embodiment an island 648 suitably supported in the central region of the conduit 620, and formed of a dielectric material, contains output electrodes 650 through 660 which are shown situated in the interior of the island and distributed along the axis of the conduit 620. The electrodes 650 through 660 may be formed as rings or as discs, but are referred to as discs, reserving the ring designation for electrodes on the conduit. The electrodes 650 through 660 may alternatively be fitted with respect to island 648 in any of the several ways described for the electrodes 34 and 36 with respect to conduit 20 in the embodiment of FIG. 1A, or may be buried in an otherwise solid island in which suitable provision is made for leads to be connected to the electrodes 650-660. Electrical leads 662 are connected to each of the electrodes 650 through 660 and brought out (through suitable openings in the electrodes if discs) for connection in one of the several arrangements discussed above. These connections, associated terminals, and load are omitted from FIG. 6. While the angular taper of the bore of conduit 620 and the outer surface of the island 648 are shown the same, the mean radius of the region between these surfaces increases and this region constitutes a divergent section for use with a gaseous fluid. A region of uniform section such as that between two cylinders may also be used. In the embodiments discussed previously the output electrodes were located peripherally with respect to the conduit while in the present embodiment the output electrodes 650 through 660 are located axially with respect to the conduit. It is apparent to one skilled in the art that the radial forces exerted upon the charged particles by the axially located electrodes in FIG. 6 are in a direction opposite to those exerted by the peripherally located electrodes of FIGS. 1 through 5. Charging electrodes may be fitted to conduit 620 as shown, to island 648, or to both, in this and other embodiments where an island structure is used.

Figure 7:
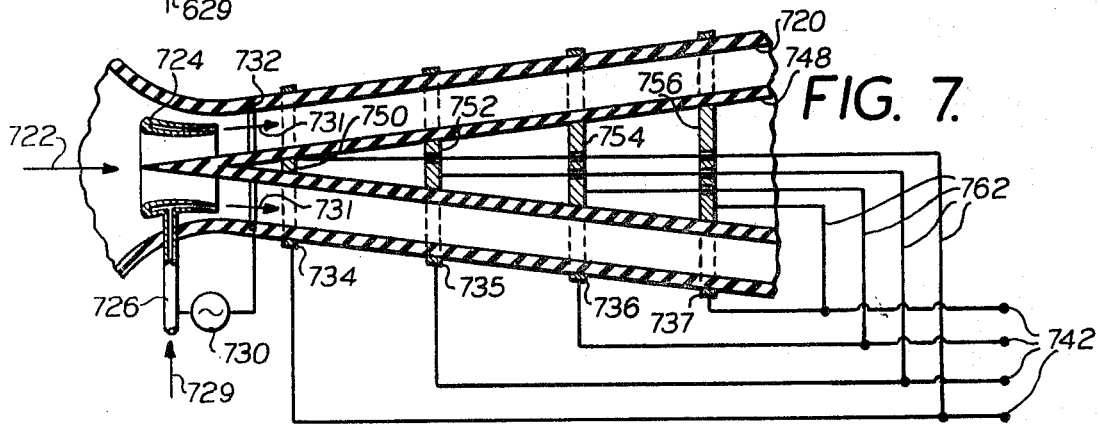
FIG. 7 is a longitudinal sectional view of another embodiment of this device in which the electrodes are both axially and peripherally situated.

In the embodiment of FIG. 7 both axial and peripheral electrode structures are employed in order to provide opposed radial forces on the charged particles. Here a gaseous fluid stream 722 is introduced into a conduit 720, particles 729, 731 are injected through a leader 726 and nozzle 724, and the charging source 730 is connected between the leader 726 and charging ring 732. Observing the distinction that electrodes associated with island 748 are referred to as discs (whereas they could, if desired, be rings) while electrodes associated with the conduit 720 are referred to as rings, each of the discs 750 through 756 is electrically connected to its radially opposite ring 734 through 737 by suitably insulated and routed leads 762. Each of the radially opposed pairs such as ring 736 and disc 754 is then treated as a single electrode for purposes of connection in one of the arrangements discussed previously. If certain of the paired rings and discs are connected in groups the number of connections via leads 762 may be reduced to the number of groups. The leads 762 are then connected to terminals 742 to permit connection to a load.

This arrangement of axially and peripherally located electrodes introduces the advantage of increased coupling between output electrodes and charged particles in addition to the advantage of opposed radial forces introduced above. This increased coupling permits further reduction in terminal voltage by the method discussed in the embodiment of FIG. 4.

Figure 8:
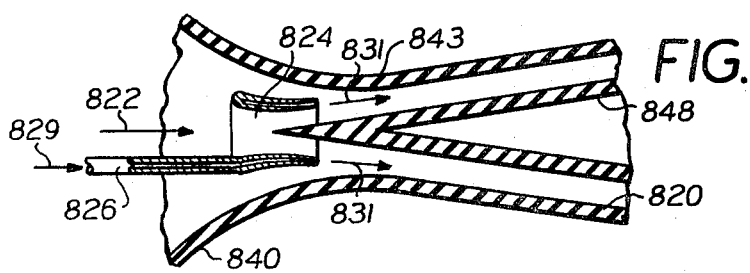
FIG. 8 is a longitudinal sectional view of another embodiment of this device which is designed for use with a gas travelling at supersonic velocity.

In FIG. 8 the alternating current electrofluid dynamic generator is adapted for high velocity flow of a compressible fluid. The fluid flow rate is preferably supersonic. Here the fluid stream 822 is introduced into a conduit 820, while particles 829, 831 are introduced into the stream by means of a leader 826 and nozzle 824. A central island 848 is shown and is suitably supported within the conduit 820. The presence or absence of island 848 is dictated by the choice of electrode configuration. The usual electrical equipment for charging is required as are the output electrodes together with their terminals, connections, and load, but all of these are omitted from FIG. 8 for clarity of illustration. The fluid enters a convergent region 840 at subsonic velocity and is increased in velocity by passage through this section to preferably supersonic velocity. In order to avoid deliberate introduction of supersonic shock the parts which might induce such shock such as the nozzle 824, leader 826, and leading end of island 848 have all been moved upstream into the subsonic portion of convergent region 840 so that the charging and release of charged particles takes place in a subsonic region. The leader 826 preferably approaches the nozzle 824 axially instead of radially in order to reduce upstream turbulence. The taper and finish of the walls of the conduit 820 and the island 848 and the curvature of the throat section 843 in contact with the fluid stream are all selected in accordance with well established practices for gaseous flow.

In FIG. 9 there is seen an alternative structure which provides inner and outer output electrodes to exert opposing forces upon the charged particles, but in a manner different from the embodiment of FIG. 7. In the present embodiment the flow path is confined to the space between two walls 920.1 and 920.2 and these walls are shown bent into the shape of partially flattened concentric cylinders cut in the longitudinal direction. The term "cylindrical" is used here as a convenient rather than exact description of the configuration. The fluid stream 922 preferably flows at right angles to the cylindrical axis and in the flow path defined by inner conduit wall 920.1 and outer conduit wall 920.2 past nozzle 924 where particles are injected. Source 930 is connected between leader 926 and the pair of charging electrodes 932.1 and 932.2 mounted in walls 920.1 and 920.2 respectively. Nozzle 924 is flattened from its previous annular shape to a hollow rectangular shape better suited to the present configuration. Electrodes in the form of thin strips preferably perpendicular to the flow path and therefore preferably parallel to the cylindrical axis are mounted on the conduit walls in matched pairs so that there is an electrode on the inner wall such as 950, 952, or 954 each corresponding to respective electrode 934, 935, or 936 on the outer wall. Each electrode in a pair is then electrically connected to the other and the pair is then treated as a single electrode as was done in the embodiment of FIG. 7 and then further connected into one of the single phase or polyphase arrangements complete with terminals and load discussed earlier. It is apparent from the embodiment of FIG. 9 that the invention may take a form and have a flow path other than the generally cylindrical-conical configuration suggested by other figures.

In the embodiment of FIG. 10 the transverse plane electrode configurations of the previous embodiments are replaced by "helically" wound output electrode strips 1034 and 1036 which permit terminal voltage reduction as in the embodiment of FIG. 4 and which permit continuous coupling to the charge distribution all along the working length of the conduit 1020 with only two electrode strips in the case of a single-phase device, and with m strips in the case of an m-phase device. In other words, the helical output structure minimizes the number of discrete electrodes and electrical connections thereto without sacrificing the principal advantages of the previous embodiments. The term "helical" is not used here in its strictest mathematical sense but rather as a convenient generalization of the actual electrode configuration described below.

In FIG. 10 the fluid stream 1022 is introduced in an axial direction at the entrance of the conduit 1020. The bore may be tapered as shown, or uniform, depending on the fluid used. Charged particles are injected by nozzle 1024. Slanted vanes 1070 on the interior surface of the wall of conduit 1020 impart a helical motion to the fluid stream and the charged particles entrained therein. While other methods such as directed jet streams may be used to impart helical motion the vane method is the only one shown because methods of imparting helical motion to a fluid stream are well known to persons skilled in the art. The helical output electrodes 1034 and 1036 are wound about conduit 1020 as substantially parallel strips, the local helical angle of the electrodes substantially matching the local helical angle of one sign of charged particles at a fixed instant of time so that at any instant of time each electrode connects together a line of points at the same phase angle with respect to the charge distribution. Thus the electrodes are disposed along lines which even in the absence of the electrode would, at any given instant of time, be of constant potential. Thus, the lines are of uniform potential at all times. While these helical electrodes have been restricted to conduit 1020 for clarity, an island structure such as is shown in FIGS. 6, 7 and 8 but with helical electrodes replacing ring and disc electrodes may be used. If both conduit and island electrodes are used these electrodes should match radially with respect to winding details and be connected in matched radial pairs as exemplified by electrodes 1350 and 1352 on island 1348 of FIG. 13. These helical electrodes may be affixed to the conduit or island wall in any of the ways suggested for the discs or rings, and here again the preferred arrangement is that in which the electrodes are buried within the material of the conduit or island wall and separated from the fluid stream by a thin section of the respective conduit or island material with external connection as previously described. These helical electrodes may also be cut into segments corresponding to the subgroups described in the embodiment of FIG. 4.

To understand the operation of the FIG. 10 embodiment assume for the moment that the charge distribution has been frozen at an instant when the center of the positive charge distribution in one particular transverse plane is nearest electrode 1034. If there is one particular transverse plane for which this relation applies it also applies for all transverse planes because this electrode was originally wound to connect all points at a common phase angle with respect to the charge distribution. Thus the potential of electrode 1034 is most influenced by the positive charges. If electrode 1036 is wound at the preferred single-phase position half a local wavelength away from electrode 1034 then its potential is most influenced by the negative charges. If the situation is reexamined half a period later the signs of the charges nearest each of the electrodes will have changed leading to a reversal of potential on each of the electrodes and an alternating potential between the electrodes which is applied to load 1038 by means of terminals 1042 and 1044 connected to convenient points on electrodes 1034 and 1036 respectively. Uniform spacing is the preferred spacing between electrodes in a polyphase embodiment of FIG. 10. As the local wavelength differs along the flow path due to conduit shape and other factors, the spacing between successive turns of electrodes 1034 and 1036 will preferably differ correspondingly.

The charging arrangements shown in the previous figures will not produce the "helical" charge distribution which is the basis for the embodiment of FIG. 10 and cannot be used with this embodiment. A suitable nozzle-source-charging electrode arrangement for use with FIG. 10 is shown in detail in FIG. 10A. FIG. 10A shows the nozzle 1024 with exit opening 0124.1, and the leader 1026. The charging ring is split into two segments 1032.1 and 1032.2 electrically insulated from one another and from the nozzle and leader excepting the electrical connections as shown. The primary winding of transformer 1064 is connected to charging supply 1030. The secondary of transformer 1064 is centertapped and this centertap is electrically connected to the nozzle via conducting leader 1026. One end of the secondary winding is connected to charging electrode 1032.1 and the other end to charging electrode 1032.2. The spacing between and angle occupied by the electrode segments 1032.1 and 1032.2 are chosen to provide well-defined charging fields between each respective segment and nozzle 1024. In order to understand the operation of FIGS. 10 and 10A, consider an instant at which the charging electrode 1032.1 is at positive potential with respect to nozzle 1024 and the electrode 1032.2 is at negative potential with respect to nozzle 1024. For the instant described charged particles leaving the nozzle in the vicinity of the positive electrode 1032.1 will have negative charge while charged particles leaving the nozzle in the vicinity of the negative electrode 1032.2 will have positive charge. Half a cycle later electrode polarities and particle charges will be interchanged. Since this embodiment produces a periodic transverse charge distribution which is carried along by the stream as a first approximation of the helical distribution it may be used with the embodiment of FIG. 10.

FIG. 11 shows a modification of the segmented charging electrode arrangement for use with the embodiment of FIG. 10. Here the charging ring has been split into six segments 1132.1 through 1132.6 each of which is electrically insulated from the other excepting for the electrical connections shown. The charging segments 1132.1 through 1132.6 are connected to the ends of the secondaries of a six-phase star connected transformer 1164 and the leader 1126 is connected to the star point. The spacing between and angle occupied by the electrode segments are chosen to provide effective charging. The transformer primary and charging source are not shown. In order to understand the operation of this modification, assume an instant of time for which segment 1132.1 is at peak positive potential with respect to the nozzle and assume the transformer secondary phasing to be such that segment 1132.3 is at increasing positive potential, segment 1132.3 is at decreasing negative potential, segment 1132.4 is at peak negative potential, segment 1132.5 is at increasing negative potential, and segment 1132.6 is at decreasing positive potential. For the instant described the strongest negative particles will be released from the nozzle in the vicinity of electrode 1132.1 and the strongest positive particles in the vicinity of electrode 1132.4. One-sixth of a cycle later these strongest particles will be released in the vicinity of electrodes one position clockwise (i.e., electrodes 1132.2 and 1132.5), in the next sixth of a cycle another position clockwise (i.e., electrodes 1132.3 and 1132.6) and so on so that the charge distribution makes one complete rotation for every complete cycle of the charging supply. This rotating transverse distribution combined with the axial charge transport due to the fluid stream produces the helical charge distribution for the embodiment of FIG. 10. While the above explanation is based upon six phases exciting six segments other numbers may be used. Since there is no need to match the number of charging phases to the number of output phases each may be selected as convenient recognizing that the advantage of a charge distribution more closely resembling a helix goes with an increase in the number of charging phases. If island configurations are used charging segments may be fitted to the conduit, the island, or both. If both, the preferred arrangement is that in which the segments match radially with respect to potential and angle. The production of charged particles in the vicinity of electrodes not at or near peak potential can be suppressed if desired either by adjusting charging potentials to take advantage of the "threshold effect" which requires a certain minimum voltage gradient at the site of particle emergence in order to effectively charge particles of a given minimum size, or by suitably modifying the temporal variation of the charging potentials, or both. These modified potentials may be obtained from the output of circuits well known to persons skilled in the art.

FIG. 12A shows the upstream portion of a typical embodiment with conduit 1220, nozzle 1224 with outer surface 1224.2 inner surface 1224.3 and exit opening 1224.1, leader 1226, and charging electrode 1232 which may be continuous or may be segmented as in the embodiments of FIGS. 10A and 11. The upstream end of conduit 1220 may be convergent as shown or may be of other shape such as the cylindrical tube of FIG. 1A. The portion of the conduit 1220 upstream of the transverse plane ZZ slightly upstream of nozzle opening 1224.1 is lined with a conducting material 1290 which is smoothly fitted to minimize turbulence and electrically connected to nozzle 1224 via leader 1226. While this conducting lining 1290 is the preferred arrangement, the entire portion of the conduit upstream of transverse plane ZZ may alternately be made of conducting material, or a conducting ring may be fitted at plane ZZ in any of the several ways suggested earlier for the charging ring. In order to understand the purpose of this conducting lining compare the conductivity and the dielectric constant of the insulating material of conduit 1220 with the conductivity and the dielectric constant of the fluid stream. If in the absence of conducting lining 1290 either the conductivity or the dielectric constant of conduit 1220 is significantly higher than the conductivity or the dielectric constant respectively of the fluid stream then most of the potential drop will occur between the nozzle 1224 and the conduit 1220 instead of in the desired region between charging ring 1232 and nozzle exit opening 1224.1. This change in the potential distribution prevents effective charging. If the conducting lining 1290 is fitted and connected as shown the desired distribution will be restored provided the exciting supply is capable of handling the current between the charging ring and conducting lining without suffering a loss of voltage. The exact upstream location of plane ZZ is selected on the basis of effective particle charging.

In the embodiment of FIG. 12B the fluid stream enters the conduit 1220 and entrains the particles 1231 injected by the nozzle 1224 at exit opening 1224.1. While the conduit 1220 is shown as a cylindrical tube the shape may be altered for convenience and to suit the working fluid. A charging electrode 1232 is shown connected to network 1295 as is an output electrode 1234. A source 1230 is connected between charging electrode 1232 and side 1296.2 of single-pole double-throw switch 1296. Side 1296.3 of switch 1296 is connected to network 1295, and arm 1296.1 of switch 1296 is connected to leader 1226. Since both charging electrode 1232 and output electrode 1234 are downstream of the site of charged particle formation the pair of electrodes 1232 and 1234 may be considered output electrodes and are connected to load 1238. The electrode 1232 serves the dual function of charging electrode and output electrode. If the output of network 1295 matches the output of source 1230 then the arm 1296.1 of switch 1296 may be thrown from the position in which the output of source 1230 is used as charging supply to the position in which source 1230 is disconnected and a portion of the output modified as necessary by network 1295 is used as the charging supply. Source 1230 can be eliminated if some means is provided for starting. This self-charging effect can also be used with multiple output electrode and with single purpose charging electrode configurations described above.

There is, in addition to the intentional self-excitation described above, a possibility of parasitic self-excitation caused by elements in or near the device combining to act as a charging circuit. Since these parasitic effects may be undesirable, all elements not intentionally at other potential are preferably connected to the nozzle electrically. Other parasitic suppression techniques such as shielding, grounding, and shorting with frequency selective networks are well known to persons skilled in the art.

In the devices of FIGS. 1 through 13 the bulk of the energy input was nonelectrical and via the fluid stream. The remainder of the input was the electrical energy required to charge the particles. The output was the electrical energy supplied to the respective loads. Since the electrical output is sensitive to changes in the charge distribution which is in turn sensitive to the electrical input the device may also be made to serve as an amplifier, and, with self-excitation, as an oscillator. Since the electrical output is sensitive to changes in the stream velocity the device may be made to serve as a flowmeter. The preferred arrangement for a flowmeter is one in which, using FIG. 4 as an example, the conduit is a tubular cylinder of uniform bore and the multiple electrodes are equally spaced. The load is replaced with an output detector and the frequency of the charging supply is adjusted until the minimum frequency is found for which the output is zero. At this frequency, which is measurable by a frequency meter, the electrodes are spaced one wavelength apart and the flow velocity is the product of frequency and electrode spacing. The flow rate is the product of flow velocity and conduit section (bore area). If desired, a flow meter can be constructed by adjusting the frequency so as to yield a maximum voltage output at the electrodes. Again, assuming that the frequency is the lowest frequency to yield a maximum output voltage, it will be known that the electrodes are spaced apart one-half wavelength, whereby to enable the calculation of flow velocity to be made.

Not to be overlooked is the class of devices in which the input is electrical and the output a higher energy fluid stream.

In this class of devices the charged particles are transported along the flow path at greater velocity than the fluid stream by forces produced by applying an electrical potential to the electrodes. These charged particles drag the fluid along, contributing to the flow energy of the fluid stream. Applications include a pump in which the device is used to effect transport of a fluid, a compressor in which flow energy is imparted to a compressible fluid and then converted to potential energy in a pressure vessel, and a thrust engine in which the reaction to this imparting of additional flow energy is used to drive or steer a vehicle. This thrust engine is particularly suited for space propulsion where the advantages of an electric thrust engine or electrically augmented thrust engine have long been recognized but where problems associated with charge accumulation have been the discouraging factor. Since the alternating current electrofluid dynamic thrust engine acts on both kinds of charged particles it solves the problem of charge accumulation. Due allowance should be made for reaction torque in applying embodiments such as FIGS. 9 and 10 for use as a thrust engine. If desired, an electromagnetic winding can be disposed about the conduit and be energized in order to set up an axial magnetic field within the conduit, whereby to direct the charged particles flowing within the conduit axially therethrough and not radially in order to maximize the thrust of the engine. To the skilled art worker this is obviously one form of magnetic focusing.

In this and other applications where the device is simultaneously connected to two sources (i.e., the charging supply and the input to the electrodes) provision should be made to adjust the phase of one with respect to the other. Since it is usually easier to adjust the lower powered source, provision for such adjustment was made in the description of source 30 in the embodiment of FIG. 1A.

If the combustion of gases is being employed as the source of high velocity fluid flow, means can be provided for preventing inadvertent flame-outs. Thus, an electric igniter can be provided upstream of the nozzle 24, 224, etc., in the area of combustion, which electric igniter will be connected to the output terminals to thus be energized by the output of the device itself. Thus, should there be an accidental flame-out, the electrical igniter will reignite the combustible gases.

As used herein the term "electrode" is any conductive member coupled to the charged particles flowing within the conduits. The shape of them is not critical and they may have a dual function such as, for example, a charging ring or electrode may be employed simultaneously as an output electrode as shown in FIG. 12B. Likewise, it will be obvious to those skilled in the art that under certain circumstances the electrodes may be slotted or laminated or the like in order to reduce eddy currents or otherwise improve their efficiency or operativeness. Such changes are contemplated within the scope of this invention.

It will now be appreciated that the present invention for the first time provides an electrofluid dynamic generator which is inherently an AC device. Moreover, problems of extremely high terminal voltage, space charge accumulation, and breakdown between electrodes exposed to the fluid stream are overcome. This device also has utility as an amplifier, a compressor, a pump, a flowmeter, and as a thrust engine particularly suited to space applications. It is to be understood that the above described embodiments of the invention are merely illustrative of the principles thereof and that numerous modifications and embodiments of the invention may be derived within the spirit and scope thereof such as those enumerated above.

What is claimed is:

1. An electrofluid dynamic energy conversion device comprising,
   a. means defining a fluid flow path,
   b. means for introducing particles into fluid in said flow path,
   c. charging means for imparting different charges to different ones of said particles,
   d. means for causing said charged particles to flow downstream along said path from said particle introducing means, whereby to produce a spatio-temporally periodic charge distribution along said flow path, and
   e. a pair of spaced apart electrodes positioned for electrical coupling to said charged particles, said electrodes being spaced from each other in the direction of particle flow, said electrode spacing being so related to said spatio-temporally periodic charge distribution that said electrodes are coupled thereto at other than at corresponding phase points of said charge distribution.

2. A device as in claim 1, for transferring electrical energy between said electrodes and external circuitry, said device further comprising terminals for said transfer.

3. The device as in claim 1, for generating alternating current electricity, said device further comprising means for connecting a load between said electrodes, whereby to derive an AC output therefrom.

4. A device as in claim 2 wherein said flow path defining means comprises a conduit made of an insulating material said particle introducing means comprises an electrically conductive structure which injects said particles into said conduit, a temporally periodic potential source, said conductive structure being connected to one side of said potential source, and said charging means comprises an electrode which is coupled to said injected particles and is connected to the other side of said potential source.

5. A device as in claim 2, wherein said flow path defining means comprises a conduit made of an insulating material, and said output electrodes are separated from said charged particles by at least part of the thickness of the wall of said conduit, whereby to capacitively couple said electrodes to said charged particles.

6. A generator as in claim 3, wherein said output is single-phase and said electrodes are two in number, the spacing between said electrodes being substantially an odd integral multiple of one-half wavelength of said spatial distribution.

7. A generator as in claim 6 further comprising a second pair of electrodes spaced from each other by an odd integral multiple of one-half wavelength of said spatial distribution, means for electrically connecting one of said first pair of electrodes to one of said second pair which are spaced from each other by an integral number of said wavelengths to form a first electrode group, means for electrically connecting the second of the electrodes from said two pairs, said second electrodes also being spaced from each other an integral number of said wavelengths, and means for connecting a load between said two groups of electrodes.

8. A generator as in claim 3 for generating polyphase power, said electrodes comprising an electrode group having the same number of electrodes as the number of phases to be generated by the generator, each two of said electrodes in said group being spaced apart substantially by an integral multiple of one wavelength of said spatial distribution divided by said number of phases in which said division results in a fraction of a wavelength whose denominator is the number of phases, plus $n$ wavelengths, where $n$ is an integer including zero.

9. A polyphase generator as in claim 8, wherein there are two of said electrode groups, said generator further comprising means electrically connecting together pairs of electrodes from said two groups, said pairs of electrodes being spaced from each other substantially by an integral number of said wavelengths.

10. A device as in claim 2, wherein said electrodes are situated at the longitudinal axis of said flow path.

11. A device as in claim 10, further comprising at least one electrode situated at the periphery of said flow path substantially opposite one of said first mentioned electrodes.

12. A device as in claim 2, wherein said particle flow causing means comprises a fluid stream flowing along said path, and said particle introducing means comprises an annular nozzle interposed in said flow path and formed with a central opening to permit said fluid to flow therethrough, said nozzle opening in the downstream direction to allow the contents thereof to be drawn into said fluid stream, and a leader for conveying said particles to said nozzle.

13. A device as in claim 12, wherein said flow path is bounded by an outer wall having a streamlined profile which first narrows and subsequently widens said flow path in the downstream direction, said particle injecting means being situated upstream of said narrow region, and having a streamlined profile which tapers downstream toward said narrow region.

14. A device as in claim 13 further comprising an axial island situated in the interior of said means for defining said flow path, said island having a streamlined shape tapering in the upstream direction and extending to a location upstream of said narrow region.

15. A device as in claim 2, wherein said flow path is substantially in the shape of an arc of a cylinder, said particle flow being directed substantially peripherally about said cylinder, and said output electrodes extending substantially axially of said cylinder.

16. A generator as in claim 3, further comprising means for imparting helical motion to said particles, said output electrodes being formed as elongated strips wound as helixes about the axis of particle flow, said electrode strips being wound in relation to the spatial distribution of charge so that said electrode strips are each disposed along a line of substantially uniform potential.

17. A generator as in claim 16, wherein said charging means comprises a plurality of discrete charging electrodes spaced in different radial directions from the axis of said particle flow and a temporally periodic potential source having a like plurality of different phases, and means for connecting respective phases of said potential source to respective ones of said plurality of charging electrodes.

18. A device as in claim 2 for use as an accelerator of fluid material, wherein said means for causing said particle flow comprises means for introducing a moving stream of fluid material into said flow path, said particle introducing means being arranged to inject said particles into said moving stream whereby they become entrained therein, said device further comprising means for imparting to said electrodes an AC accelerating potential for producing a potential wave having a phase velocity which is greater then the velocity of said space charge distribution in the absence of said AC accelerating potential whereby to accelerate said fluid material.

19. A fluid compressor comprising a fluid accelerator device as in claim 18, a source of said fluid material connected to the inlet of said flow path, and means connected to the outlet of said flow path for confining said fluid material under pressure.

20. A reaction powered vehicle comprising a fluid accelerator device as in claim 18 and a vehicle, said device being oriented to discharge the accelerated fluid rearwardly of said vehicle so that reaction to the acceleration of said fluid provides forward propulsion for said vehicle.

21. An electrofluid dynamic device as in claim 1 wherein said charging means comprises at least a pair of discrete charging electrodes at respective charging locations displaced in different radial directions from the axis of said particle flow, and means for applying differential charging potentials to said charging electrodes whereby to charge said particles to different charge levels at said respective charging locations, means for causing said particles to flow helically about said axis, whereby to distribute said different charge levels in a spatial pattern comprising different polarity regions extending downstream in helically interleaved relationship, said downstream electrodes being formed as elongated strips wound substantially parallel and adjacent to respective ones of regions of uniform potential over the length of said strips, said strips being electrically coupled to their respective adjacent regions of uniform potential, means for imparting relative rotary movement between said strips and said particle flow whereby continuously to shift said different polarity regions into and out of electrically coupled relation with each of said strips, and means for electrical connection to said strips.

22. A device as in claim 2, wherein said electrical energy is single-phase, said electrodes are two in number, and the spacing between said electrodes is an odd integral multiple of one-half wavelength of said spatial distribution.

23. A device as in claim 2, wherein said electrical energy is polyphase, said electrodes comprising an electrode group having the same number of electrodes as the number of phases of said polyphase energy, each two of said electrodes in said group being spaced apart substantially by an integral multiple of one wavelength of said spatial distribution divided by said number of phases in which said division results in a fraction of a wavelength whose denominator is the number of phases, plus *n* wavelengths, where *n* is an integer including zero.

24. A generator as in claim 6, further comprising a second pair of electrodes spaced from each other by an integral multiple of one-half wavelength of said spatial distribution.

25. A generator as in claim 8, further comprising a second of said electrode groups.

26. The device of claim 3, wherein said particle introducing means is electrically conductive, and said means for charging said particles comprises a charging electrode in spaced confronting relation with said particle introducing means, and circuit means for connecting said pair of spaced apart electrodes to said particle introducing means and said charging electrode.

27. The device of claim 4, further comprising a conductive lining on said conduit extending upstream only of said particle introducing means, and means for electrically connecting said conductive lining to said particle introducing means.

28. The device of claim 4, wherein the electrode of said charging means is one of said spaced apart electrodes.

29. The method of measuring the rate of fluid flow through a flow path of substantially uniform cross section, said flow path being in closely spaced relation with a pair of electrodes spaced apart along the direction of said flow path a preselected distance, said method comprising the steps of:

introducing particles into said fluid;
periodically charging said particles;
measuring the voltage between said pair of electrodes;
and adjusting the periodicity of said particle charging until said voltage between said electrodes is zero; whereby to yield a measure of fluid flow velocity.

30. The method of measuring the rate of fluid flow through a flow path of substantially uniform cross section, said flow path being in closely spaced relation with a pair of electrodes spaced apart along the direction of said flow path a preselected distance, said method comprising the steps of:

introducing particles into said fluid;
periodically charging said particles;
measuring the voltage between said pair of electrodes;
and adjusting the periodicity of said particle charging until said voltage between said electrodes is maximum; whereby to yield a measure of fluid flow velocity.

* * * * *